United States Patent

Schenk

[11] Patent Number: 6,049,198
[45] Date of Patent: Apr. 11, 2000

[54] POWER SUPPLY DEVICE WITH TWO OUTPUT VOLTAGES

[75] Inventor: Joachim Schenk, Hemmingen, Germany

[73] Assignee: Robert Bosch GmbH, Stuttgart, Germany

[21] Appl. No.: 08/765,550

[22] PCT Filed: Mar. 19, 1996

[86] PCT No.: PCT/DE96/00473

§ 371 Date: Jan. 16, 1997

§ 102(e) Date: Jan. 16, 1997

[87] PCT Pub. No.: WO96/37947

PCT Pub. Date: Nov. 28, 1996

[30] Foreign Application Priority Data

May 26, 1995 [DE] Germany ............ 195 19 298

[51] Int. Cl.[7] ............... H02P 9/00; H02H 7/06
[52] U.S. Cl. ............ 322/90; 322/93; 322/25; 322/28
[58] Field of Search ............ 322/90, 93, 28, 322/25

[56] References Cited

U.S. PATENT DOCUMENTS

| | | | |
|---|---|---|---|
| 4,153,869 | 5/1979 | Ragaly | 322/90 |
| 4,169,992 | 10/1979 | Nash | 322/46 |
| 4,314,194 | 2/1982 | Severing | 322/90 |
| 4,692,684 | 9/1987 | Schaeffer | 322/90 |
| 4,999,563 | 3/1991 | Suzuki | 322/90 |
| 5,214,371 | 5/1993 | Naidu | 322/29 |
| 5,323,102 | 6/1994 | Tori et al. | 322/90 |
| 5,418,401 | 5/1995 | Knaeyuki | 322/90 |

FOREIGN PATENT DOCUMENTS

| | | |
|---|---|---|
| 3226426 | 12/1984 | Germany . |
| 4226311 | 11/1994 | Germany . |

OTHER PUBLICATIONS

F. Meyer, et al Autoelektrik Autoelektronik Am Ottonmotor, Robert Bosch GmbH, ISBN 3–18–419106, 1987, pp. 24–26.

Primary Examiner—Nestor Ramirez
Assistant Examiner—Peter Medley
Attorney, Agent, or Firm—Michael J. Striker

[57] ABSTRACT

The voltage supply device for the motor vehicle electrical system includes e.g. a self- or separately-excited generator having stator windings (10,11,12) and an excitation coil (E); a main bridge rectifier device connected to the stator windings having a first connector (B+) at which a first voltage (UB+) is delivered; an exciter bridge rectifier device connected to the stator windings; an exciter voltage regulator device connected between the exciter bridge rectifier device and the excitation coil (E) for regulation of an excitation current passing through the excitation coil; an additional rectifier device connected to the stator windings (10,11,12) having a second connector (B2+) at which a second voltage (UB2+) is tapped and a device for regulating a load current delivered by the generator to the first connector (B+) or the second connector (B2+) that includes a thyristor (Th0,Th4) connected to the first or second connector and a triggering device (A) whereby the generator has an optimal power output. During full load operation the load current is limited with the load current regulating device, while during partial load operation the exciter current is regulated by the exciter voltage regulator device. The invention can also be applied to voltage supply systems with permanently excited generators.

11 Claims, 6 Drawing Sheets

POWER SUPPLY DEVICE WITH TWO OUTPUT VOLTAGES

BACKGROUND OF THE INVENTION

1. Field of the Invention

The invention relates to a device for voltage supply, in particular in a motor vehicle electrical system, and, more particularly, to a voltage supply device in a motor vehicle electrical system comprising a self-excited, separately-excited or permanently-excited generator delivering a load current and two rectifier arrangements connected downstream of the generator, which deliver a first voltage at a first connector and a second voltage at a second connector.

2. Prior Art

In connection with a motor vehicle electrical system, wherein the supply voltage required for the electrical consumers is generated by means of a generator, it is known that more than one supply voltage should be provided by the generator, so that a dependable, component-specific supply voltage is assured. To this end it is proposed in DE-OS 37 41 242 to embody a separately-excited rotary current generator in such a way that, besides the usual rectified voltage of the vehicle electrical system, rotary current voltages are made available in addition, which are directly used for supplying a window heater. In this case the regulation of the generator is performed with the aid of a voltage regulator which acts on the exciter current. The additional voltage for supplying the heating coils is not rectified, so that losses which unavoidably occur in the course of rectification are prevented.

With some vehicle electrical systems, permanently-excited generators are employed in place of a separately-excited generator. Since an exciter current regulation is not possible with such generators, it is customary to construct the bridge rectifiers downstream of the generator as regulated bridge/-half bridge rectifiers which, for example, comprise semiconductor power switches which are regulated by an associated voltage regulator in such a way that the voltage supplied at the output of the bridge rectifier is approximately constant or is not exceeded, so that it can be used as the voltage of the vehicle electrical system and can be used for charging the vehicle battery or batteries. Such a permanently-excited generator, including the associated regulated bridge rectifier, is known, for example, from DE-OS 38 41 610, however, the generation of a second voltage is not provided in this case.

SUMMARY OF THE INVENTION

It is an object of the present invention to provide an improved voltage supply device, in particular in a motor vehicle electrical system, which has two different connectors at which two different output voltages are delivered from a generator and in which the generator operates in a state in which an optimum power output takes place.

According to the invention the voltage supply device includes

- a self- or separately-excited generator having stator windings and an excitation coil;
- a main bridge rectifier device connected to the stator windings and having a first connector at which a first voltage is delivered by the generator;
- an additional rectifier device connected to the stator windings and having a second connector at which a second voltage is tapped;
- an exciter bridge rectifier device connected to the stator windings;
- an exciter voltage regulator means connected between the exciter bridge rectifier device and the excitation coil for regulation of an excitation current passing through the excitation coil; and
- means for regulating a load current delivered by the generator to the first or second connector, so that the generator operates in an operational state, in which an optimum power output takes place.

In the case in which a permanently excited generator is used in the voltage supply device the voltage supply device comprises

- the permanently-excited generator including its stator windings;
- a main bridge rectifier device connected to the stator windings and having a first connector at which a first voltage is delivered by the generator;
- an additional rectifier device connected to the stator windings and having a second connector at which a second voltage is tapped; and
- means for regulating a load current delivered by the generator to the first or second connector, so that the generator operates in an operational state, in which an optimum power output takes place.

In the case of both the self-excited generator and the permanently excited generator the means for regulating the load current comprises a thyristor connected to the first or second connector, which in a preferred embodiment is not included in either rectifier device, and a triggering device for triggering the thyristor, whereby during full load operation the thyristor is triggered by the triggering device so that a limitation of the load current takes place but during partial load operation the load current is controlled either by the exciter voltage regulator means or additional power components in the case of permanent excitation.

The devices for voltage supply in accordance with the invention, have the advantage of the known ones in that several voltages are available and a regulation is simultaneously performed which, independently of the actually prevailing load, maintains the generator in an operational state in which an optimal power output can take place.

This advantage is achieved in that a generator with a second or several outputs is used, and further rectifier arrangements are inserted between the generator stator and the additional connecting terminals, and additional means are provided with the aid of which the load current of the generator can be acted on. In this case the additional means comprise controllable power switches which either replace a portion of the bridge rectifier or are connected downstream thereof. With a separately-excited generator, the regulation of the exciter current can either relate to the stator voltage, the B+ voltage or the B2+ voltage or Bx+ voltage, and is performed in the customary manner by the voltage regulator.

The mentioned advantages are achieved in the same way in connection with a permanently-excited generator wherein, in place of the exciter current regulation, regulation can take place at all B+ connectors voltages/load currents which can be tapped off.

It is particularly advantageous that it is possible by means of the devices in accordance with the invention to perform a voltage regulation which assures that under full load operation of the generator a load current limitation takes place while, with a partial load operation of the generator the output voltage is performed either with the aid of the voltage generator which regulates the exciter current or, with a permanently-excited generator, a voltage limitation takes place with the aid of additional power components.

Further advantages of the invention can be achieved by means of the steps recited in the dependent claims.

If the stator winding of the generator, which consists of several turns, is tapped, it is possible in an advantageous manner to draw off voltages in a fixed relationship with the regulated output voltage. It is possible by means of such taps to construct a generator system for higher voltages, in this case additional turns are necessary for the higher voltages.

The invention can be employed in an advantageous manner for generators with star or delta connections, parallel multi-star or delta connections, or combinations of star and delta connections.

BRIEF DESCRIPTION OF THE DRAWING

Exemplary embodiments of the invention are represented in the drawings and will be described in detail in the following description.

Shown in detail are in FIG. 1, a first exemplary embodiment, wherein customary bridge rectifiers are employed, and an additional regulated switch element for limiting the load current of the generator is present.

An exemplary embodiment is represented in FIG. 2, wherein the positive rotary current bridge is replaced by controllable switch elements.

An exemplary embodiment is represented in FIG. 3, which largely corresponds to that of FIG. 1, but in addition has a regulated output.

An exemplary embodiment is represented in FIG. 4, wherein each generator winding has two connections.

Examples for multi-taps with star and delta circuits are shown in FIGS. 10 and 11.

DESCRIPTION OF THE EXEMPLARY EMBODIMENTS

Figure 1:
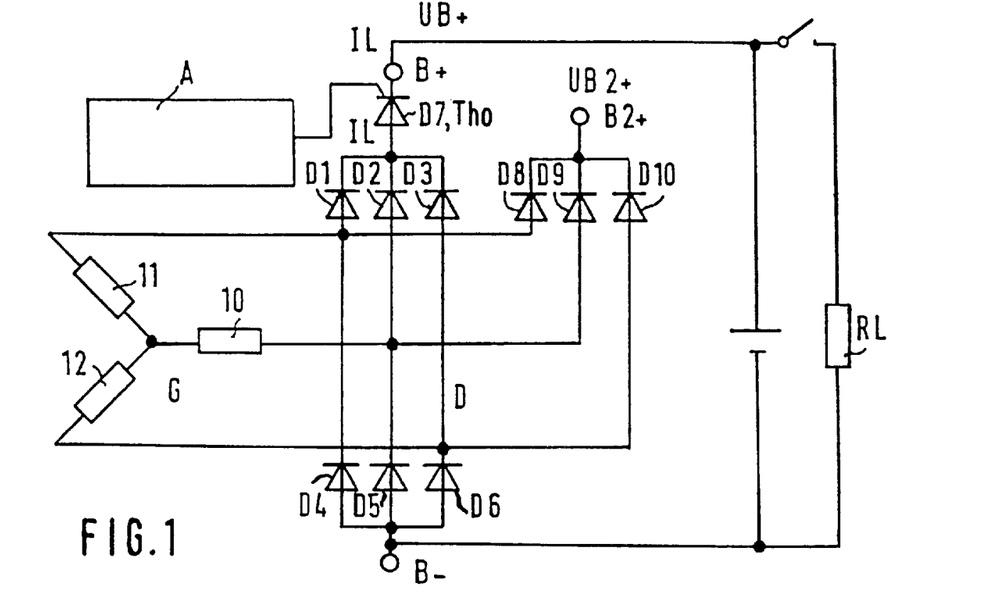

Only the stator windings 10, 11, 12 of the generator G are represented in FIG. 1. In this case it is unimportant whether the generator G is a separately-excited or a permanently-excited generator.

The stator windings 10, 11, 12 are connected in the customary manner with the bridge diode D. In the usual manner, the diodes D1, D2, D3 are called plus diodes, the diodes D4, D5, D6 minus diodes. The negative connection of the bridge diode D is identified by B−, the other side of the bridge diode D leads via a controllable semiconductor power switch D7 to the connection B+, where the voltage UB+ appears. The semiconductor power switch D7 is triggered by means of the triggering device A.

FIG. 1 also shows an embodiment in which the power switch D7 is a thyristor Th0. In this embodiment the current delivered at the connector B+ is limited in the case of heavy or full load by means of the thyristor Th0 which is triggered by the triggering device A as explained further below.

A further bridge diode with diodes D8, D9, D10 is connected with the stator windings 10, 11, 12 and with the centers of the bridge diodes D and leads to the additional connector B+2, where the voltage UB2+ appears.

By means of the circuit arrangement represented in FIG. 1, which is limited to the components essential for the invention, an additional voltage can be coupled out at the connector B+2 which, with the regulation still to be explained, has the desired properties. The load current IL delivered by the generator G is limited by the triggering device A in such a way that in case of a heavy load indicated symbolically in FIG. 1 by the load resistor RL it is possible to limit the current IL in a predetermined manner to be described later.

Figure 2:
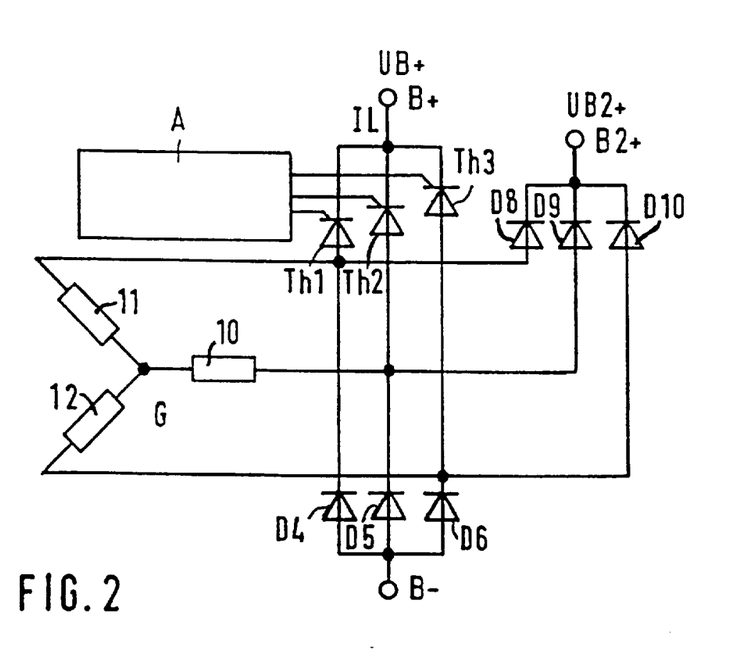

In the exemplary embodiment represented in FIG. 2, wherein like parts again have the same identification, the positive semi-bridge of the bridge rectifier has been replaced by a triggered bridge rectifier which, for example, comprises the thyristors Th1, Th2, Th3, which are triggered by the triggering device A for limiting the load current IL.

Figure 3:
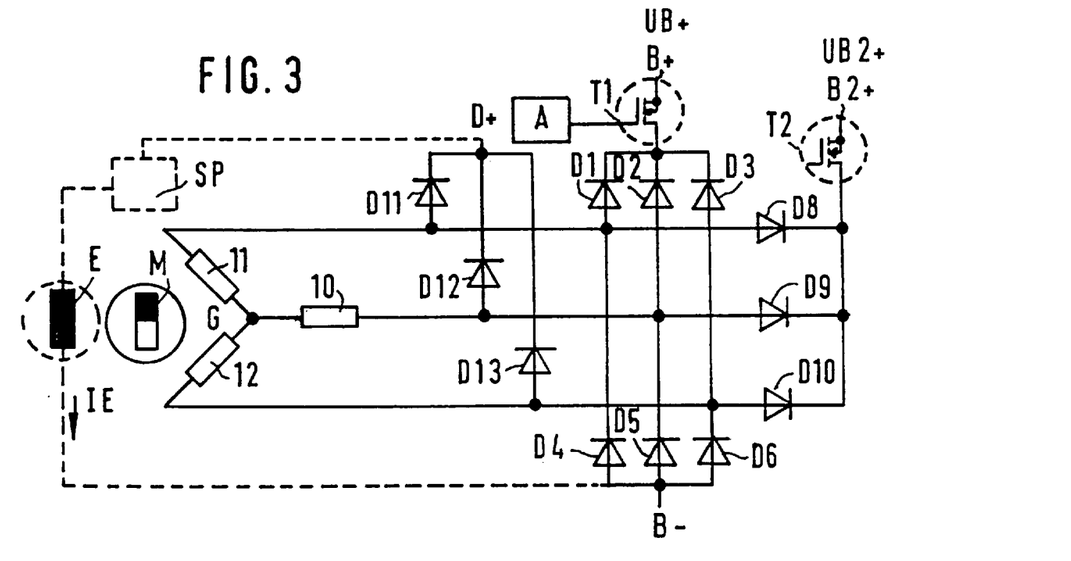

A further exemplary embodiment is represented in FIG. 3, which contains a permanently-excited generator (M) or, drawn in dashed lines, a self-exited or separately-excited generator, having an exciter coil E, a regulated additional output with a regulated voltage UB2+ and an external load switch or linear controller. Like components have again been given the same reference numerals, the same as in the further exemplary embodiments. In this exemplary embodiment of FIG. 3, which relates to a separately-excited generator, the exciter current bridge with the exciter diodes D11, D12, D13 has been additionally represented. These exciter current diodes lead to the connector D+ and by means of it via the voltage regulator SP and the exciter coil E to the generator connector B−. The current through the exciter coil IE is regulated in a known manner by means of the voltage regulator SP, so that the output voltage of the generator remains approximately constant.

In the exemplary embodiment of FIG. 3, the transistor T1 is used for limiting the load current and it can be triggered by means of the triggering device A, with the aid of a further transistor T2 it is possible to generate an additional regulated output voltage UB2+ on the cathode side of the additional diodes D8, D9, D10, wherein triggering of the transistor T2 takes place as a function of the load in such a way, that T2 operates as a linear regulator or switching regulator.

Incidentally, the transistor T2 can be omitted, if a self- or separately-excited generator with exciter current regulation is employed.

Figure 4:
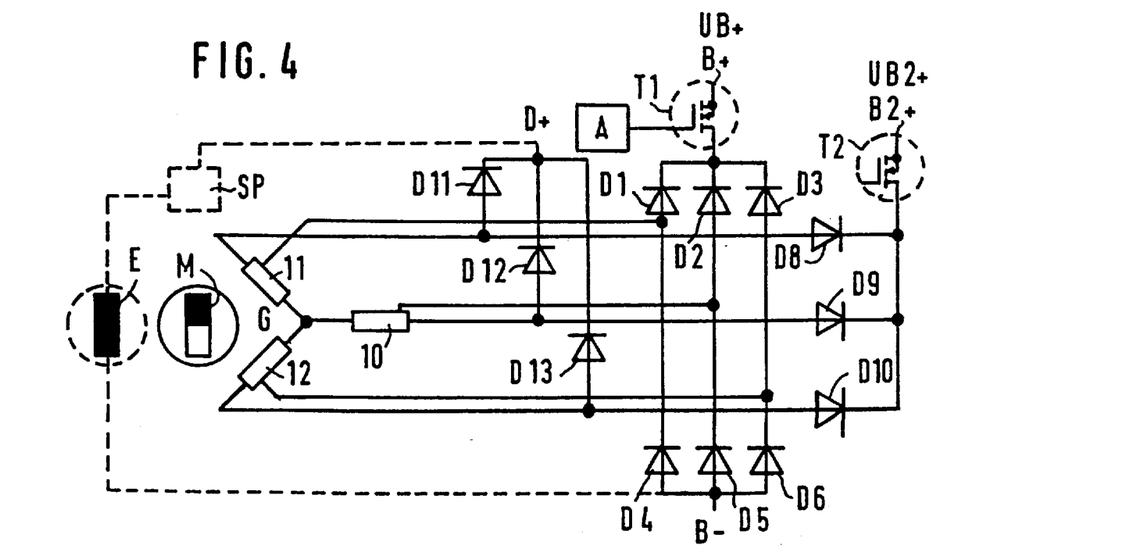

An exemplary embodiment is represented in FIG. 4, wherein the stator windings 10, 11, 12 respectively have a second connector (which can also be provided several times), which are used for coupling out the additional voltage via the diodes D8, D9, D10. This circuit arrangement, which again is suitable for a permanently-exited generator as long as the transistor T2 is present, or for a self- or separately-excited generator (in dashed lines) with exciter current regulation, wherein the transistor T2 can be omitted, delivers a second voltage UB2+ as the second generator output voltage, which is higher than the voltage tapped at B+, wherein the size of the voltage depends on the tapping point.

Figure 5:
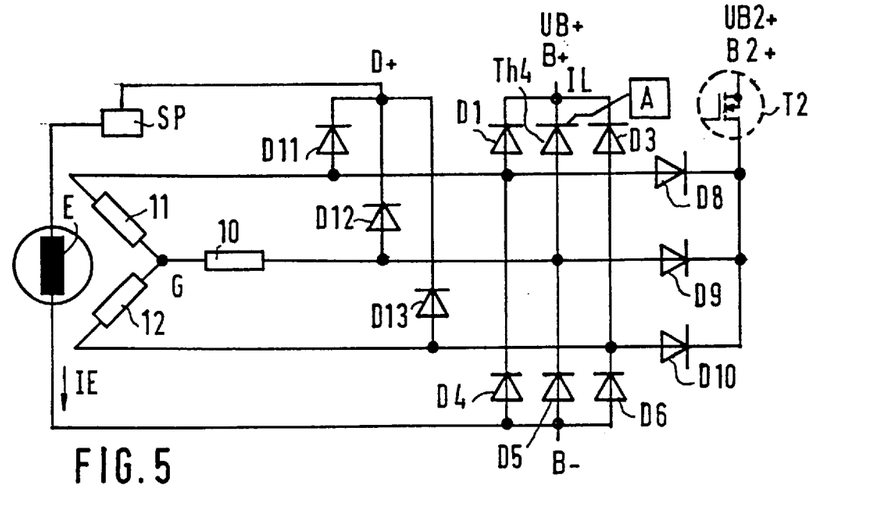
FIG. 5 shows an exemplary embodiment for an electrically excited generator with single-phase load current regulation and FIG. 6 an example with a permanently-excited generator corresponding to that of FIG. 2, but which additionally has a regulated output.
Figure 6:
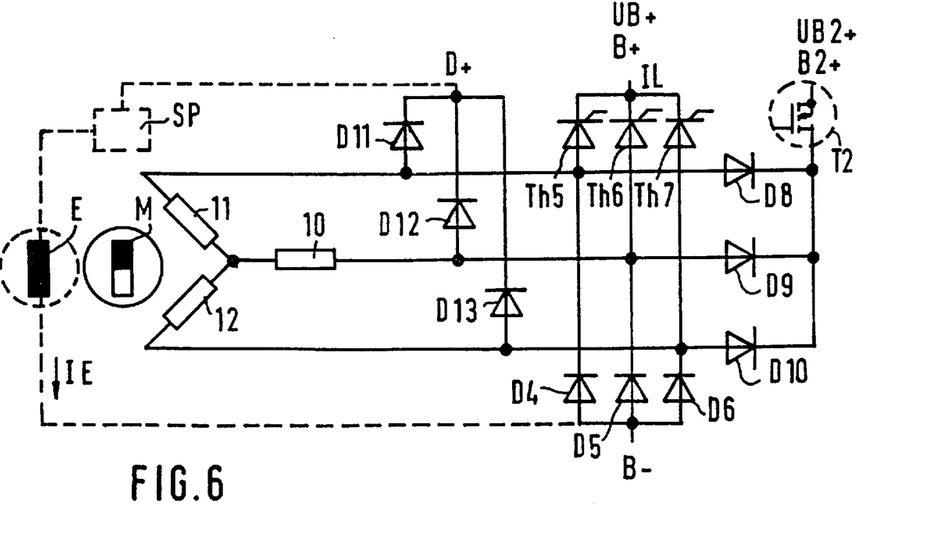
Figure 7:
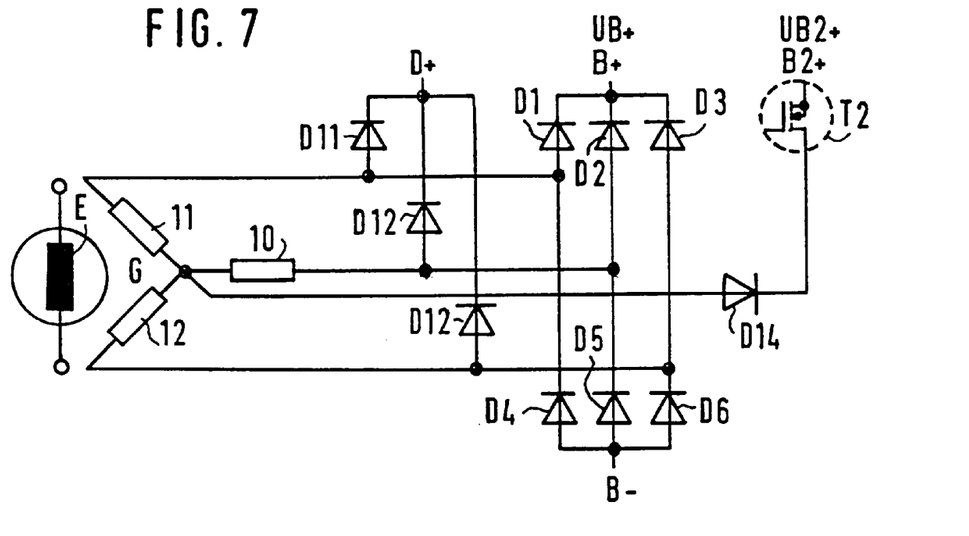
FIGS. 7 to 9 show further exemplary embodiments of an electrically excited generator, wherein in FIG. 7 a star center tap with a downstream-connected additional diode and a load adjuster is present.
Figure 8:
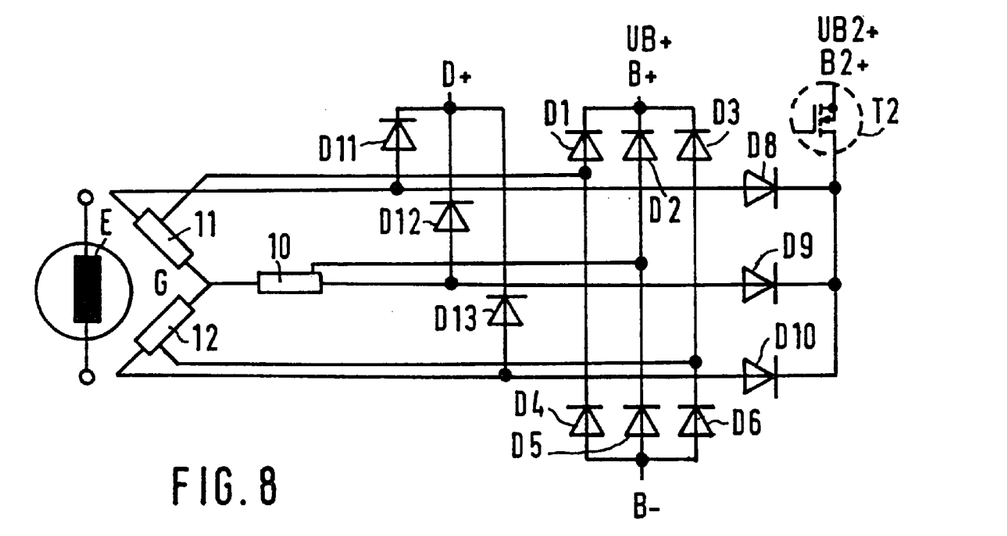
Figure 9:
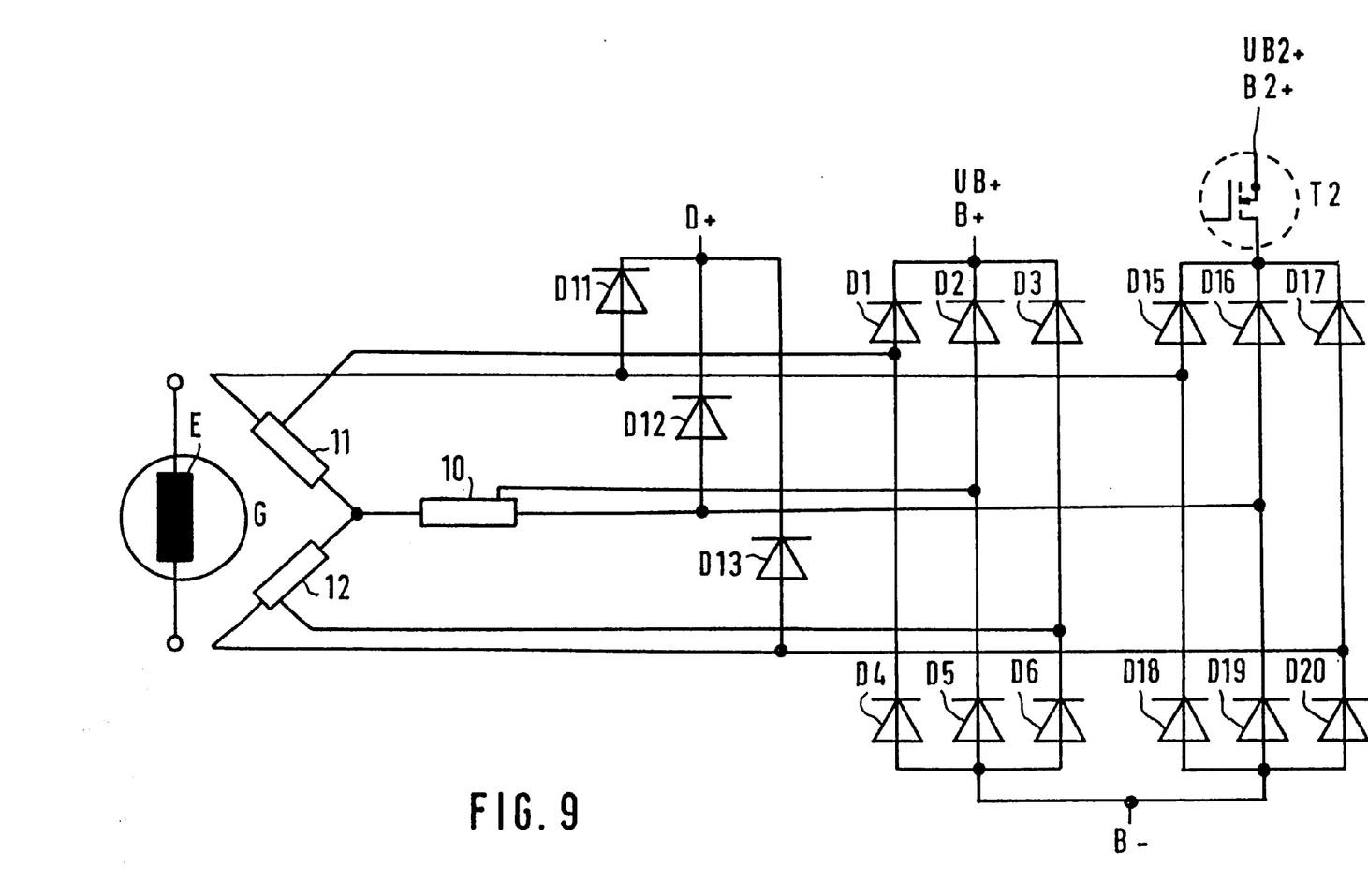

The exemplary embodiments represented in FIGS. 5 to 6 differ from those already described only in that the one or several diodes are replaced by a thyristor. Here, the thyristors are identified by Th4 to Th7. It is therefore possible by means of the power components shown to represent 1-, 2- or 3-phase-regulated semi- or full bridges. Additional outputs can be represented as 1-, 2- or 3-phase-regulated/unregulated semi- or full bridges with differing power components. In addition, tapping at the center by means of a regulated or unregulated rectifier is possible, as shown in FIG. 7 by way of example. The additional connector B2+ in FIG. 9 is connected with the generator via a bridge rectifier D15 to D20 as well as a load current-limiting semiconductor component T2.

All exemplary embodiments represented in FIGS. 1 to 9 have at least one component, which can be triggered, in the main bridge rectifier or between the generator and the connector B+, by means of which the load current IL of the generator can be acted on. Furthermore, all exemplary embodiments have in common that, besides the customary connector B+, at which a first voltage UB+ can be tapped, at least one second connector B2+ is provided, at which a second voltage UB2+ can be tapped wherein, depending on the design, this second voltage can be a d.c. voltage or an a.c. voltage. In addition, this second voltage can be equal to the customary voltage in the vehicle electrical system, or it can have higher or lower values in respect to it, depending on the connection to the stator windings 10, 11, 12 or the type of the power controller (linear or switch regulator).

With the exemplary embodiments with an additional bridge rectifier, the generator can deliver d.c. current at the additional outputs. Depending on the connection of the additional output terminal or additional output terminals, there can be a separation between the current supply systems, by means of an appropriate triggering of the controllable components, for example thyristors, it is possible to equip one of the outputs with a higher priority so that, for example, a charging priority for a start reservoir can be realized.

Figure 10:
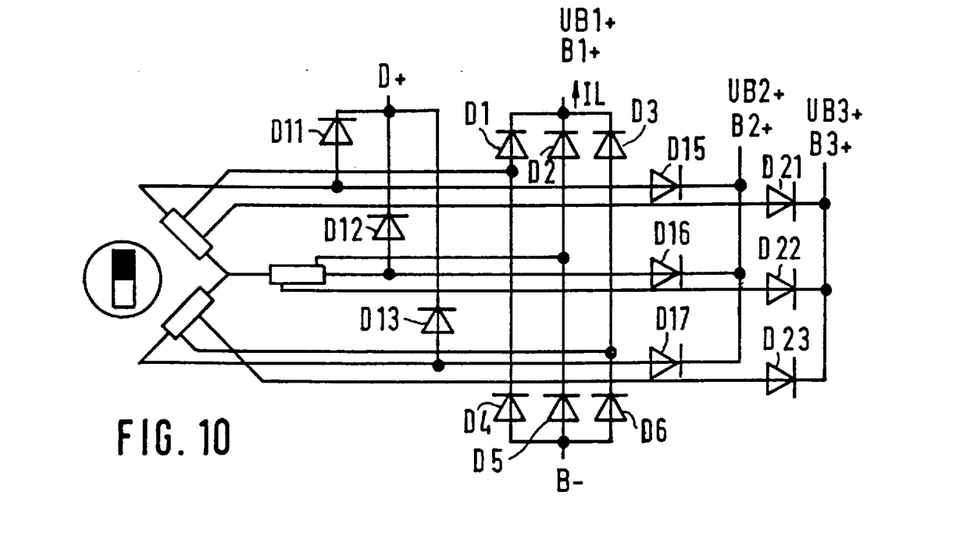
Figure 11:
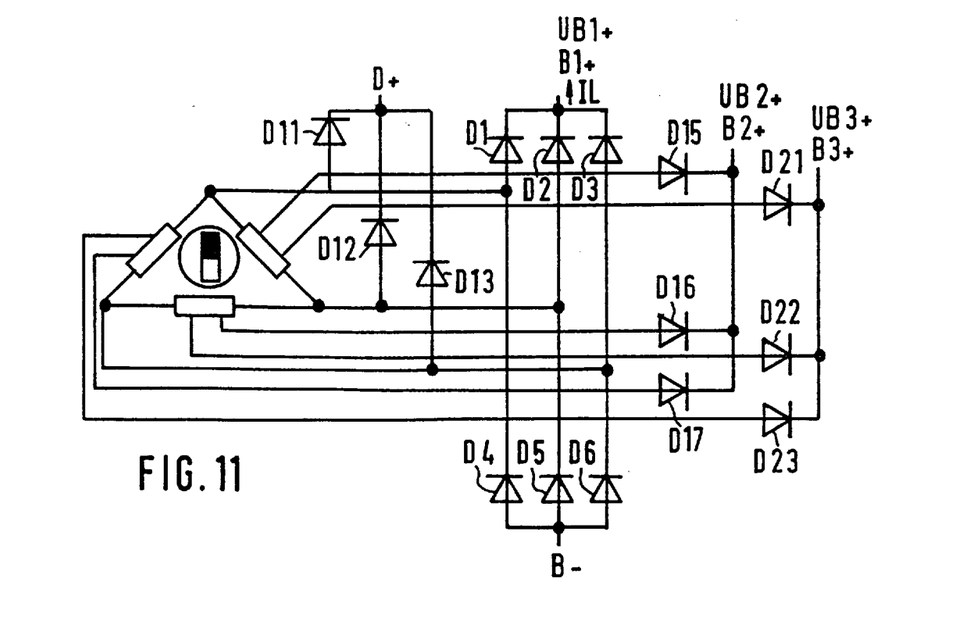

Circuits for a generator with multiple taps of the stator winding are represented in FIGS. 10 and 11, wherein FIG. 10 represents a star circuit and FIG. 11 a multiple tap in a delta circuit. Several voltages can be obtained by means of such circuits, the size of whose voltages is a function of the point of tapping, wherein $$U_{Bx+} = \frac{UB+ \cdot \text{tapped winding}}{\text{Total number of windings}}$$

If the initial voltage is regulated, the voltages UB2+, UB3+ which are obtained, are also regulated. By means of the employment of linear controllers, not shown in FIG. 10, FIG. 11, or the replacement of the individual diodes by controllable semiconductor power switches, a regulation the same as in the exemplary embodiments 1 to 9 is possible.

Regulation of the generators takes place in such a way that with self- or separately-excited generators the output voltage at the terminal B+ takes place by interrupting the exciter current, i.e. in the customary way by means of a voltage regulator. However, when regulating a generator, a differentiation is made between full load operation and partial load operation. With full load operation, wherein the voltage size of the generator is determined by the amount of the required load current, it might be possible that in case of too large a load the terminal voltage drops too low, so that problems arise for supplying the individual consumers or that they must be designed in such a way that they still operate dependably even with clearly lower voltage in the vehicle electrical system. Therefore, in connection with the proposed regulation under full load operation, the load current IL of the generator is limited to a predetermined value, so that it is assured that the output voltage of the generator, and thus the additional outputs, cannot fall below a corresponding value. The limitation of the load current takes place by means of triggering of the controllable component(s) of the bridge rectifier. In the exemplary embodiments represented, the trigger device A will supply the thyristors with appropriate trigger signals.

With the exemplary embodiments, wherein the rotary current bridge was not partially, half or fully replaced by power switches, the load current limitation takes place by triggering the power switch between the bridge rectifier and the connector B+.

The output voltage at the terminal B2+ can either be regulated with the aid of the transistor T2, or an unregulated voltage can be delivered. The transistor T2 can be omitted with a conventional exciter current regulation and a regulated output voltage is still obtained.

During partial load operation of the generator, the output voltage is either limited by the customary voltage regulator or, with permanently-excited generators for example, is limited with the aid of an (additional) power component disposed at the outputs. Triggering of the regulated rectifiers, the thyristors or semiconductor power components, can take place in the form of a block, phase-shift operation or linear operation. A possibly provided d.c. current regulator can be operated continuously.

By means of the different regulation of the generator in full load operation it is possible to operate the generator continuously in a range which just corresponds to the transition to full load. By means of this it is assured under all circumstances that the generator delivers the maximally possible power output, which is obtained at the partial load/full load threshold.

Determination of the load on the generator can take place by measurement of its output voltage, by measurement of the load current or of the exciter current/keying ratio, etc.

The invention is not limited to the exemplary embodiments represented, instead it can basically also be realized for generators which not only have one or two, but a plurality of additional outputs, for example by means of additional winding taps or parallel or insulated additional windings wherein, depending on the tap point, it is possible to set different voltage sizes at the corresponding outputs Bx+, so that component-specific voltages UBx+ can be obtained, where x=1, 2, 3, etc.

Other high-speed components can also be employed instead of the thyristors represented, for example high-speed semiconductor components, it is also possible for a bridge to have different circuit elements.

The bridge rectifiers can be designed as semi-regulated bridges with diodes or Zener diodes, or as fully regulated bridges, which assure total junction protection.

With permanently-excited generators, each connection must be provided with a power controller, so that no excess voltage can appear at the connectors. In addition to the voltage limiting function, these power controllers can also be used for load current regulation to the most effective generator point.

The regulation of generators of the following types or in combination of the following characteristics can be:

| | |
|---|---|
| Stator winding: | Star or delta, or combination singly or multiply (parallel or insulated from each other) |
| Excitation: | Self, separately, permanently or combined |
| Taps: | Center of the diode or power switch, or combination |

-continued

| | |
|---|---|
| Rectifiers: | Winding taps singly or multiply<br>Rotary bridge, singly<br>Rotary bridge, multiply |
| additional: | Common ground reference or<br>different ground reference |
| type: | Semi-regulated rotary bridge<br>fully-regulated rotary bridge<br>partially-regulated rotary bridge (only 1<br>or 2 phase) |
| Diodes: | Standard diodes,<br>Schottky or low voltage diodes<br>Z-diodes |
| Controllable<br>Power Switches: | Plus- or minus-sided<br>at one or several or all connectors |

In connection with generators with star circuits with additional turns at the outer winding ends, windings with lower power cross section can also be used for utilizing the free spaces in the winding chamber.

In connection with generators with separate stator winding(s), windings with star or delta points which are insulated from each other, or uninsulated star points are placed into the winding chambers. Here, combinations of star and delta circuits are also conceivable.

What is claimed is:

1. A device for voltage supply in a motor vehicle electrical system comprising
   a self- or separately-excited generator (G) having stator windings (10,11,12) and an excitation coil (E);
   a main bridge rectifier device connected to said stator windings (10,11,12), said main bridge rectifier device having a first connector (B+) at which a first voltage (UB+) is delivered by said generator;
   an additional rectifier device connected to said stator windings (10,11,12), said additional rectifier device having a second connector (B2+) at which a second voltage (UB2+) is tapped;
   an exciter bridge rectifier device connected to said stator windings, said exciter bridge rectifier device having a exciter bridge rectifier connector (D+);
   exciter voltage regulator means (SP) connected between said exciter bridge rectifier device and said excitation coil (E) for regulation of an excitation current passing through the excitation coil; and
   means (T1,T2,Th0,Th1,Th2,Th3; A) for regulating a load current (IL) delivered by said generator to said first connector (B+) or said second connector (B2+), so that said generator operates in an operational state, in which an optimum power output takes place;
   wherein the means for regulating said load current comprises a thyristor (Th0), said thyristor (Th0) being connected to said first connector (B+) or said second connector (B2+) and not included in any of said rectifier devices, and a triggering device (A) for triggering said thyristor (Th0), whereby during full load operation said thyristor is triggered by said triggering device (A) so that a limitation of said load current takes place, during partial load operation an output voltage of the generator is regulated by means of said exciter voltage regulator means (SP) and said full load operation is recognized when said output voltage of said generator falls below a predetermined value.

2. The device as defined in claim 1, wherein said stator windings (10,11,12) have a common connection point connected with said first connector (B+) and said second connector (B2+) of said rectifier devices.

3. The device as defined in claim 1, wherein said stator windings (10,11,12) are connected in a star point circuit having a star point.

4. The device as defined in claim 1, wherein said stator windings (10,11,12) have a plurality of taps connected to additional connectors (Bx+) at which additional voltages (Ubx+) are tapped and respective magnitudes of said additional voltages depend on a location of said taps in said stator windings.

5. The device as defined in claim 1, wherein said stator windings (10,11,12) are connected in a delta circuit.

6. A device for voltage supply in a motor vehicle electrical system comprising
   a permanently-excited generator (M) including stator windings (10,11,12);
   a main bridge rectifier device connected to said stator windings (10,11,12), said main bridge rectifier device having a first connector (B+) at which a first voltage (UB+) is delivered by said generator;
   an additional rectifier device connected to said stator windings (10,11,12), said additional rectifier device having a second connector (B2+) at which a second voltage (UB2+) is tapped; and
   means (T1,T2,Th0,Th1,Th2,Th3; A) for regulating a load current delivered to said first connector (B+) or said second connector (B2+) by said generator, so that the generator operates in an operational state, in which an optimal power output takes place;
   wherein the means for regulating said load current comprises a thyristor (Th0), said thyristor (Th0) being connected to said first connector (B+) or said second connector (B2+) and not included in either of said rectifier devices, and a triggering device (A) for triggering the thyristor (Th0), whereby during full load operation said thyristor is triggered by said triggering device (A) so that a limitation of said load current takes place, during partial load operation an output voltage of the generator is regulated by means of additional power components and said full load operation is recognized when said output voltage of said generator falls below a predetermined value.

7. The device as defined in claim 6, wherein said stator windings (10,11,12) have a common connection point connected with said first connector (B+) and said second connector (B2+) of said rectifier devices.

8. The device as defined in claim 6, wherein said stator windings (10,11,12) are connected in a star point circuit having a star point.

9. The device as defined in claim 6, wherein said stator windings (10,11,12) have a plurality of taps connected to additional connectors (Bx+) at which additional voltages (Ubx+) are tapped and respective magnitudes of said additional voltages depend on a location of said taps in said stator windings.

10. The device as defined in claim 6, wherein said stator windings (10,11,12) are connected in a delta circuit.

11. A device for voltage supply in a motor vehicle electrical system comprising
    a self- or separately-excited generator (G) having stator windings (10,11,12) and an excitation coil (E);
    a main bridge rectifier device connected to said stator windings (10,11,12), said main bridge rectifier device having a first connector (B+) at which a first voltage (UB+) is delivered by said generator;
    an additional rectifier device connected to said stator windings (10,11,12), said additional rectifier device having a second connector (B2+) at which a second voltage (UB2+) is tapped;

an exciter bridge rectifier device connected to said stator windings, said exciter bridge rectifier device having a exciter bridge rectifier connector (D+); exciter voltage regulator means (SP) connected between said exciter bridge rectifier device and said excitation coil (E) for regulation of an excitation current passing through the excitation coil; and means (T1,T2,Th0; A) for regulating a load current (IL) delivered by said generator to said first connector (B+) or said second connector (B2+), so that said generator operates in an operational state, in which an optimum power output takes place;

wherein the means for regulating said load current comprises a thyristor (Th4), said thyristor (Th4) being connected to said first connector (B+) or said second connector (B2+) and included in said main rectifier device, and a triggering device (A) for triggering said thyristor (Th4), whereby during full load operation said thyristor is triggered by said triggering device (A) so that a limitation of said load current takes place, during partial load operation an output voltage of the generator is regulated by means of said exciter voltage regulator means (SP) and said full load operation is recognized when said output voltage of said generator falls below a predetermined value.

* * * * *